United States Patent
Evangelista

(10) Patent No.: US 8,365,708 B2
(45) Date of Patent: Feb. 5, 2013

(54) APPARATUS FOR REFORMING AIR IN AN INTERNAL COMBUSTION ENGINE

(75) Inventor: Erano Martin Evangelista, Las Pinas (PH)

(73) Assignee: Aeronox Technology Corp., Paranaque, Metro Manila (PH)

( * ) Notice: Subject to any disclaimer, the term of this patent is extended or adjusted under 35 U.S.C. 154(b) by 0 days.

(21) Appl. No.: 13/147,796

(22) PCT Filed: Jun. 18, 2009

(86) PCT No.: PCT/PH2009/000008
§ 371 (c)(1),
(2), (4) Date: Aug. 3, 2011

(87) PCT Pub. No.: WO2010/147490
PCT Pub. Date: Dec. 23, 2010

(65) Prior Publication Data
US 2011/0290222 A1 Dec. 1, 2011

(51) Int. Cl.
*F02M 27/04* (2006.01)
(52) U.S. Cl. ...................................................... 123/539
(58) Field of Classification Search ........... 123/536–539
See application file for complete search history.

(56) References Cited

U.S. PATENT DOCUMENTS

| | | | |
|---|---|---|---|
| 3,602,202 A | 8/1971 | Kobayashi | |
| 4,043,308 A | 8/1977 | Cerkanowicz | |
| 4,064,852 A * | 12/1977 | Fulenwider, Jr. ........... | 123/25 B |
| 4,308,847 A | 1/1982 | Ruizzo, Jr. | |
| 5,487,874 A | 1/1996 | Gibboney, Jr. | |
| 5,845,480 A * | 12/1998 | DeFreitas et al. ................ | 60/776 |
| 6,234,155 B1 | 5/2001 | Brothers et al. | |
| 6,523,529 B1 | 2/2003 | Moncelle | |
| 6,769,244 B2 * | 8/2004 | Headley et al. ................. | 60/289 |
| 6,802,706 B2 * | 10/2004 | Collesan ........................... | 431/2 |
| 2005/0126550 A1 | 6/2005 | Varasundharosoth et al. | |
| 2006/0225671 A1 | 10/2006 | Atherley | |
| 2006/0254567 A1 | 11/2006 | Holtzman | |

OTHER PUBLICATIONS

Aeronox Technology, Final Office Action mailed Dec. 23, 2011 for U.S. Appl. No. 11/530,468.
Evangelista, E. , International search report dated Mar. 17, 2010 for PCT/PH2009/000008.
Hosokawa, M., et al., "Nanoparticle Technology Handbook", Chapter 2: Structural control of nanoparticles, Elsevier, (2008), 551-558.

\* cited by examiner

*Primary Examiner* — M. McMahon
(74) *Attorney, Agent, or Firm* — Blakely Sokoloff Taylor & Zafman LLP

(57) ABSTRACT

An apparatus for reforming air in an internal combustion engine including means for generating electrical current that oscillates at radio frequency and conducting medium being in communication thereof, said means for generating electrical current that oscillates at radio frequency including radio frequency generating unit being in communication with a voltage multiplier, said means for generating electrical current that oscillates at radio frequency being arranged such that it is confined in a low temperature surrounding than the outside temperature, and said conductive medium having an air reforming zone with a plurality of conductive elements, said conductive elements being arranged in a manner wherein they are capable of introducing substantial electromagnetic radiation to the air within the air reforming zone to facilitate production of nitrous oxide for introduction to the air/fuel mixture of the internal combustion engine.

11 Claims, 4 Drawing Sheets

APPARATUS FOR REFORMING AIR IN AN INTERNAL COMBUSTION ENGINE

CROSS-REFERENCE TO RELATED APPLICATION

This patent application is a U.S. National Phase application under 35 U.S.C. §371 of International Application No. PCT/PH2009/000008, filed Jun. 18, 2009, entitled APPARATUS FOR REFORMING AIR IN AN INTERNAL COMBUSTION ENGINE.

BACKGROUND OF THE INVENTION

The present invention relates generally to air treatment and more specifically to an apparatus for reforming air in an internal combustion engine.

The spiraling cost of fuel and pollution have gravely affected the economy and environment. It is in this context that there is growing concern about improving the efficiency of existing energy consuming engines.

Modern gasoline engines at present are considered more efficient compared to its predecessors, however, there still exist the problem of fuel consumption and pollution. Existing internal combustion engine, particularly the reciprocating type, produces air pollution emissions due to incomplete combustion of the carbonaceous fuel. The main derivatives of the process are carbon dioxide, water and some soot, also called "particulate matter" (PM). The effects of inhaling this particulate matters have been widely studied and were proven to cause asthma, lung cancer, cardiovascular tissues and premature death. There are, however, some additional byproducts of the combustion process that includes nitrogen oxides and sulfur and some unburned hydrocarbons, depending on the operating conditions and air/fuel ratio.

The ratio of air to fuel plays an important role in the efficiency of the combustion process. The ideal air/fuel ratio for optimum emission, fuel economy, and good engine performance is about 14.7 pounds of air for every pound of fuel. This ideal air/fuel ratio is referred to as stoichiometry, and is the target that the feedback fuel control system constantly aiming for. If air/fuel ratio is richer than stoichiometry, fuel economy and emission will suffer, and if it is leaner, power and emission will suffer.

Gasoline burned in an engine contains chemicals; however, it is primarily made up of hydrocarbons (also referred to as HC). Hydrocarbons are chemical compounds made up of hydrocarbon atoms which chemically bond with carbon atoms. There are many different types of hydrocarbon compounds found in gasoline, depending on the number of hydrogen and carbon atoms present, and the way that these atoms are bonded.

Hydrocarbons in gasoline will not burn unless they are mixed with air. This is where the chemistry of combustion begins. Air is composed of approximately 21% oxygen, 78% nitrogen (N2) and minute amounts of other inert gases.

The hydrocarbon in fuel normally react only with oxygen during the combustion process to form water vapor ($H_2O$) and carbon dioxide ($CO_2$) creating the desirable effect of heat and pressure within the cylinder. Unfortunately, under certain engine operating conditions, the nitrogen also reacts with the oxygen to form nitrogen oxide (NOx), a criteria air pollutant.

In perfectly operating engine with ideal combustion conditions, the following chemical reaction would take place:

Hydrocarbons would react with oxygen to produce water vapor ($H_2O$) and carbon dioxide ($CO_2$).

Nitrogen (N2) would pass through the engine without being affected by the combustion process. In essence, only harmless elements would remain and enter the atmosphere. Although modern engines are producing much lower emission levels than their predecessors, they still inherently produce some level of harmful emission output.

It is in this context that a method and apparatus for reforming air in combustion engine was realized by herein applicant for the main purpose improving the efficiency of an internal combustion engine.

The invention which is disclosed in Philippine Patent No. 1-2006-000551 issued to the herein applicant relates to an apparatus wherein radio frequency (RF) current is utilized and driven by electromotive force to the surface of a conductor. The electromagnetic radiation created thereof facilitates the reformation of air passing thereto, thereby producing nitrous oxide which is then being made to mix with the fuel/air mixture before introduction in the combustion chamber of an internal combustion engine. The addition of nitrous oxide facilitates an increase in combustion efficiency and engine power and minimizes the emission of environmentally harmful exhaust gases. The apparatus utilizes low voltage in its operation such that there is no visible sparks or glows occurring in the air thereby preventing the risk of engine damage. The apparatus comprises means for generating electrical currents that oscillates at radio frequency (RF) and conducting medium being connected to said means for generating electrical current through an electrode line provided thereof. Means for generating current includes a radio frequency generating unit and a voltage multiplier in communication with the radio frequency generating unit through suitable electrical lines. The voltage multiplier being capable of the increasing the voltage supplied by a power source (battery) at about 800 volts to create an electromotive force sufficient enough in providing radio frequency current that would facilitate reformation of air passing through the conducting medium. The conducting medium of the apparatus includes a cylindrical structure made of conductive material wherein the electrical current that oscillates at radio frequency interacts and creates an electromagnetic radiation due to skin effect. Such electromagnetic radiation is introduced with the air to facilitate its reformation whereby nitrous oxide is produced which subsequently is mix with the air/fuel mixture of the engine.

While the aforesaid apparatus has been proven to be effective in its intended purpose, however, some problems have been observed which affects its intended function. One of these is that the conducting medium covers a wide space such that interaction of the electromagnetic radiation with the ions near the inner surface of the structure is more reactive than those in the center. In another aspect of the invention, the conductive medium is provided with a plurality of cylindrical conductive elements arranged side by side within the structure. While the provision of conductive elements at the middle of the structure significantly increases the reaction, however, there are gaps formed due to the cylindrical configuration of the conductive elements. Such gaps which are formed by the abutting outer surfaces of the conductive elements which are not coated with conductive layer, allow a substantive amount of air to pass through and leaving only about 70% to 80% being treated. This resulted in the treatment to be not in its optimal performance. Furthermore, the casing of the radio frequency generating unit and voltage multiplier is made of metal material such that it easily gets hot when installed near the engine. Such occurrence gravely affects or totally damages the electronic parts of the radio frequency generating unit and voltage multiplier.

In view thereof, it is therefore the primary object of the present invention to provide an apparatus for reforming air in an internal combustion engine which can remedy the above drawbacks of the prior art.

Another object is to provide an apparatus which can effectively and optimally treat air such that nitrous oxide is produced which is then made to mix with the fuel/air mixture being introduced in the an increase in combustion efficiency, increase the engine's power and minimize environmentally harmful exhaust gas emission.

Yet another object is to provide an apparatus for treating air wherein its conductive medium is designed in a manner wherein about 90% to 100% of the air passing therein is capable of electromagnetic radiation treatment, thereby facilitating an optimum production of nitrous oxide for mixing with the air/fuel mixture of the internal combustion engine.

Still another object is to provide an apparatus wherein the casing of its radio frequency generating unit and voltage multiplier is provided with means for preventing the accumulation of heat therein such that damaging effects on the electronic parts of said radio frequency generating unit and voltage multiplier can be prevented.

A further object is to provide an apparatus for reforming air in an internal combustion engine which is very simple, effective and can greatly contribute to the reduction of fuel consumption and environmental pollution.

Other objects and advantages of the present invention can be fully understood upon reading the following description taken in conjunction with the accompanying drawings.

DETAILED DESCRIPTION OF THE SEVERAL VIEWS OF THE DRAWINGS

Figure 1:
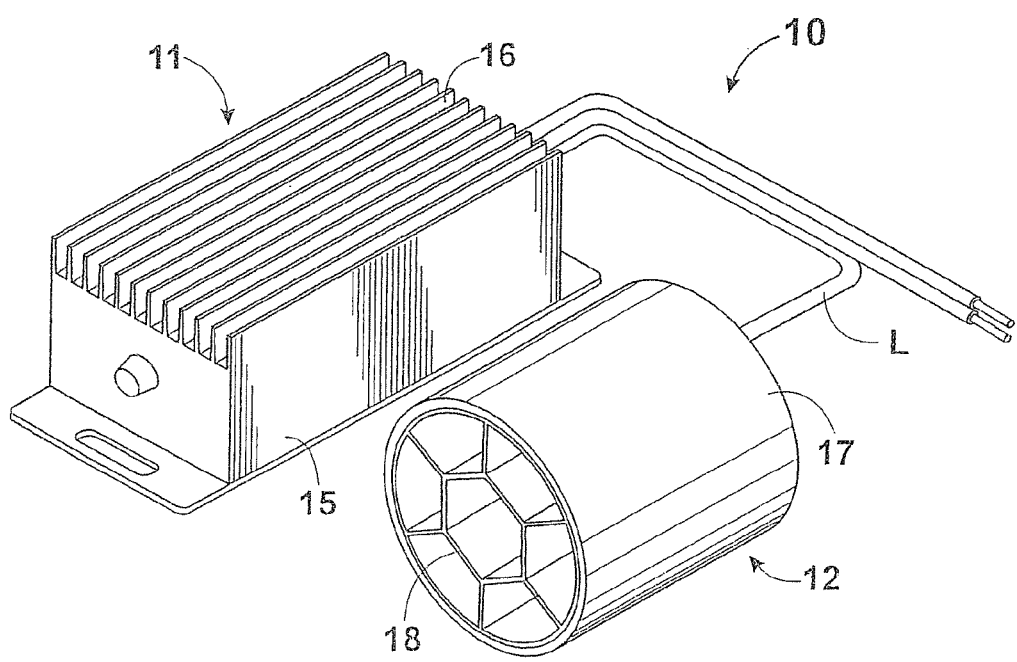
FIG. 1 is a perspective view of the present invention.
Figure 2:
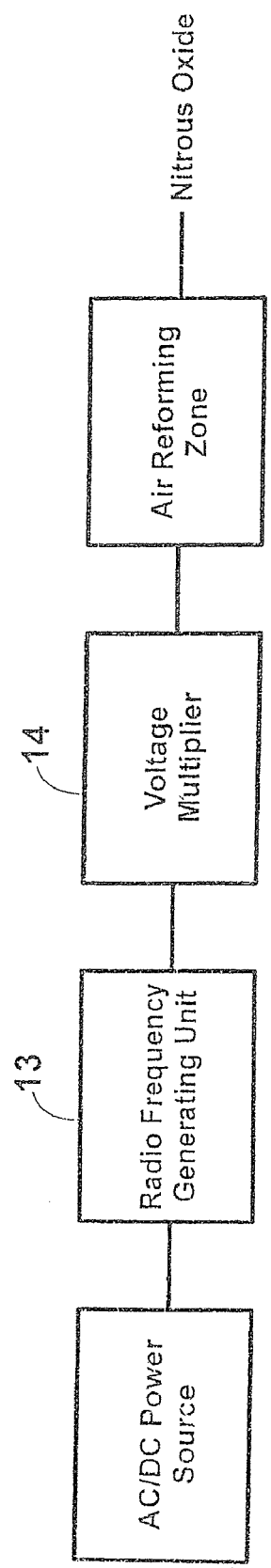
FIG. 2 is a schematic diagram of the same.
Figure 3:
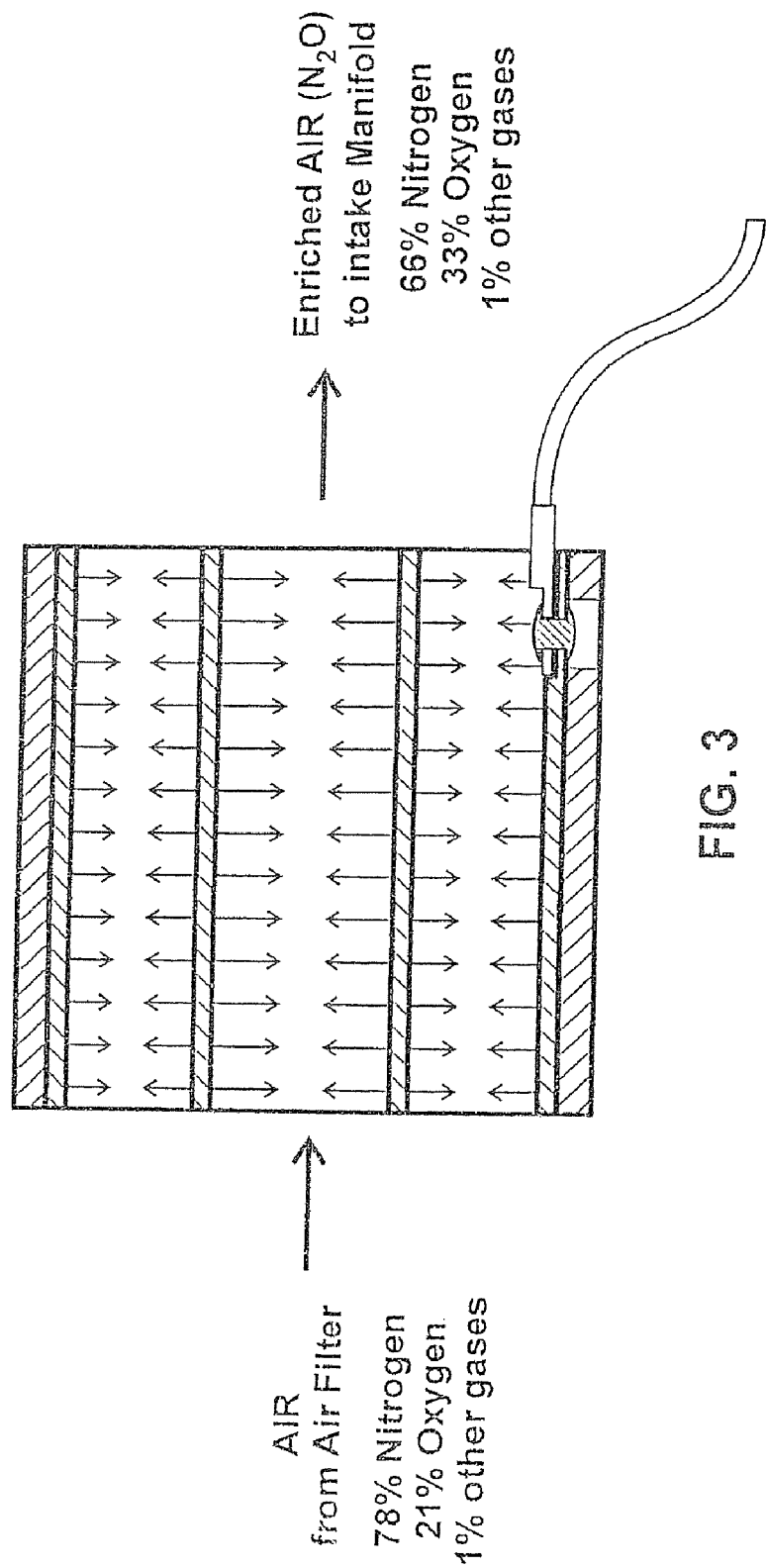
FIG. 3 is a cross-sectional view taken along line 3-3 of FIG. 1.
Figure 4:
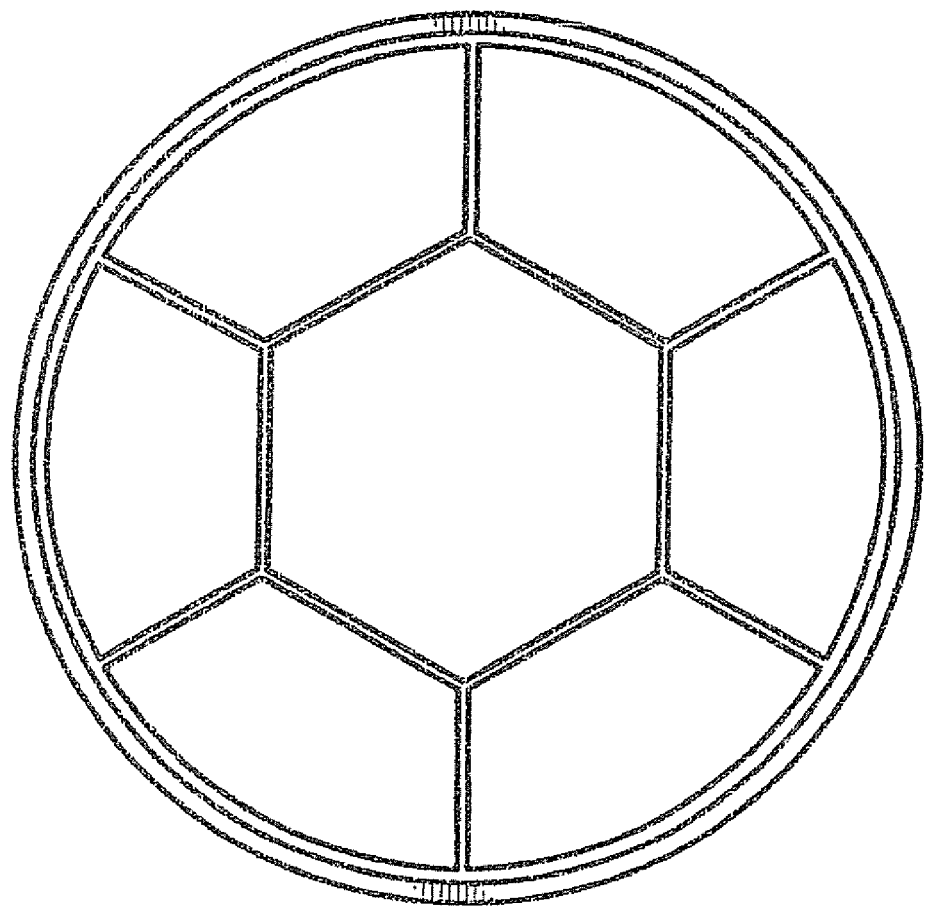
FIG. 4 is another cross-sectional view taken along line 4-4 of FIG. 1.

Referring to the drawings, there is shown an apparatus for reforming air in an internal combustion engine generally designated as 10 comprising means for generating electrical currents that oscillates at radio frequency (rf) 11 and conducting medium 12 being in communication with means 11 through suitable line, such as electrode line L. Said means for generating electrical currents that oscillates at radio frequency 11 being made such that it is capable of connection to a power source, such as battery of an internal combustion engine. Means 11 is being made in a manner wherein it is capable of creating an electromotive force that drives radio frequency (rf) current towards the surfaces of the conducting medium 12, thereby creating an electromagnetic radiation capable of transforming air into nitrous oxide. Said means for generating electrical current that oscillates at radio frequency includes a radio frequency generating unit 13 in communication with a voltage multiplier 14 through suitable electrical line. Said radio frequency generating unit 13 is being made in a manner wherein it is capable of producing frequency of alternating current electrical signals at a predetermined range suitable enough to create an electromotive force which can drive the frequency and effect interaction to the surface of the conducting medium. The effect of the interaction, which is commonly known as "skin effect" creates electromagnetic radiation in the air reforming zone provided in the conductive medium, wherein it is allowed to interact with air passing therein to facilitate its reformation. The reformed air is transformed into nitrous oxide which is then introduced in the combustion process of the internal combustion engine. Said nitrous oxide consists of nitrogen and oxygen, wherein the oxygen produced is about 50% more by weight and volume than ambient air. The introduction of this enriched nitrous oxide in the air/fuel mixture of the internal combustion engine will cause the temperature in the intake manifold and engine cylinder to drop, causing the oxygen thereof to become denser, thereby allowing a larger volume of oxygen and nitrogen to fit in the same space. Such occurrence results in an enhanced combustion, thereby resulting in increased power performance, reduced pollutant build up and emission. Voltage multiplier 14 being capable of increasing the voltage supplied by the power source at about 800 volts, such that the electromotive force that drives the radio frequency current being introduced on the conducting medium 12 is sufficient enough to facilitate reformation of air.

Said radio frequency generating unit 13 and voltage multiplier 14 are arranged in a manner wherein they are encased in a low temperature surrounding that the outside temperature. Preferably, it is confined in a casing 15 to prevent deterioration or damage to its electronic parts due to high temperature environment caused by the internal combustion engine. The casing includes the provision of fins 16 arranged on the surface of the casing for regulating the temperature or the casing itself is coated or layered with suitable insulating material. Conducting medium 12 includes an insulated hollow structure 17 having a honeycomb-like air reforming zone defined by a plurality of hollow conductive elements 18. The honeycomb-like configuration of the air reforming zone provides wider air treatment coverage of the conductive elements within the structure 17 and ensures treatment and reformation of a much bigger volume of air passing to the hollow structure 17. This will further enhance the reformation and increase the efficiency and performance of the internal combustion engine.

I claim:

1. An apparatus for reforming air in an internal combustion engine comprising:
    means for generating electrical current that oscillates at radio frequency and conducting medium being in communication thereof, said means for generating electrical current that oscillates at radio frequency including a radio frequency generating unit being in communication with a voltage multiplier, said means for generating electrical current that oscillates at radio frequency being arranged such that it is confined in a lower temperature surrounding than an outside temperature, and said conductive medium having an air reforming zone comprising a plurality of conductive elements, said conductive elements being arranged in a manner wherein they are capable of introducing substantial electromagnetic radiation to the air within the air reforming zone to facilitate production of nitrous oxide for introduction to an air/fuel mixture of the internal combustion engine.

2. An apparatus for reforming air in an internal combustion engine according to claim 1 wherein said means for generating electrical currents that oscillates at radio frequency is confined in a casing having fins that are arranged for regulating the temperature.

3. An apparatus for reforming air in an internal combustion engine according to claim 1 wherein said means for generating electrical currents that oscillates at radio frequency is confined in an insulated casing.

4. An apparatus for reforming air in an internal combustion engine according to claim 1 wherein said conductive elements are arranged in a honeycomb-like manner in the air reforming zone.

5. An apparatus for reforming air in an internal combustion engine according to claim 4 wherein said conductive elements are made of material that includes aluminum, steel, copper, silver or tin.

6. An apparatus for reforming air in an internal combustion engine according to claim 1 wherein said conducting medium is insulated.

7. An apparatus for reforming air in an internal combustion engine comprising:
   means for generating electrical current that oscillates at radio frequency and conducting medium being in communication thereof, said means for generating electrical current that oscillates at radio frequency including a radio frequency generating unit being in communication with a voltage multiplier, and said conductive medium having an air reforming zone comprising a plurality of conductive elements, said conductive elements being arranged in a manner wherein they are capable of introducing substantial electromagnetic radiation to air within the air reforming zone to facilitate production of nitrous oxide for introduction to an air/fuel mixture of the internal combustion engine.

8. The apparatus of claim 7, wherein said means for generating electrical currents that oscillates at radio frequency is confined in a casing.

9. An apparatus of claim 7, wherein said conductive elements are arranged in a honeycomb-like manner in the air reforming zone.

10. An apparatus of claim 9, wherein said conductive elements are made of material that includes aluminum, steel, copper, silver or tin.

11. An apparatus of claim 7, wherein said conducting medium is insulated.

* * * * *